(12) United States Patent
Anderson et al.

(10) Patent No.: US 6,792,874 B1
(45) Date of Patent: Sep. 21, 2004

(54) RAILROAD CAR CENTER PLATE ASSEMBLY CONDUCTIVE LINER

(75) Inventors: John D. Anderson, Aurora, IL (US); W. Matthew Tonn, Batavia, IL (US)

(73) Assignee: ZefTek, Inc., Montgomery, IL (US)

( * ) Notice: Subject to any disclaimer, the term of this patent is extended or adjusted under 35 U.S.C. 154(b) by 0 days.

(21) Appl. No.: 10/446,265

(22) Filed: May 23, 2003

(51) Int. Cl.⁷ .................................................. B61F 3/00
(52) U.S. Cl. ..................... 105/199.4; 384/422
(58) Field of Search ........................... 105/199.4, 199.1; 384/422, 462, 476, 277; 29/848, 846; 308/137; 264/105

(56) References Cited

U.S. PATENT DOCUMENTS

| | | |
|---|---|---|
| 4,014,972 A | 3/1977 | Rentz |
| 4,075,951 A | 2/1978 | Chierici et al. |
| 4,188,888 A | 2/1980 | Cooper et al. |
| 4,237,792 A | 12/1980 | Somers |
| 4,239,007 A | 12/1980 | Kleykamp et al. |
| 4,241,667 A * | 12/1980 | Wulff ...................... 105/199.4 |
| 4,258,960 A | 3/1981 | Harris |
| 4,263,361 A | 4/1981 | Hodes et al. |
| 4,289,077 A | 9/1981 | Kleykamp et al. |
| 4,308,801 A | 1/1982 | Cooper et al. |
| 4,329,780 A * | 5/1982 | Somers ........................ 29/848 |
| 4,341,162 A | 7/1982 | Mathieu |
| 4,483,254 A | 11/1984 | Meadows |
| 5,075,951 A | 12/1991 | Schurr et al. |
| 5,167,896 A | 12/1992 | Hirota et al. |
| 5,304,338 A | 4/1994 | Hertel et al. |
| 5,443,015 A | 8/1995 | Rudibaugh et al. |
| 5,558,025 A | 9/1996 | Kanjo |
| 5,776,400 A | 7/1998 | Piramoon et al. |
| 5,908,001 A * | 6/1999 | Burke et al. ............. 105/199.4 |
| 6,041,714 A * | 3/2000 | Trent et al. ............. 105/199.4 |
| 6,136,240 A | 10/2000 | Burke et al. |

OTHER PUBLICATIONS

ZefTek Car Parts Advertisement written by Zeftek, Inc., published Aug. 15, 1998.
ZefTek Cost Cutting Car Component Advertisement written by ZefTek, Inc., published prior to 2002.
Freight Car Components Advertisement written by The Holland Company, published prior to 2002.
Rail Car Components Advertisement written by The Holland Company, published prior to 2002.

* cited by examiner

*Primary Examiner*—Frantz F. Jules
(74) *Attorney, Agent, or Firm*—Bell, Boyd & Lloyd, LLC.

(57) ABSTRACT

A self-lubricating center plate assembly liner for placement between a car body center plate and a truck bolster bowl of a center plate assembly in a railroad car, wherein the liner is configured to substantially mate with the center plates and includes a body having a glass-filled urethane load-bearing portion and a plurality of carbon filled urethane compressible conductive resilient members which extend through, above and below the load-bearing portion to provide electrical continuity between the plate and bowl in the center plate assembly.

48 Claims, 4 Drawing Sheets

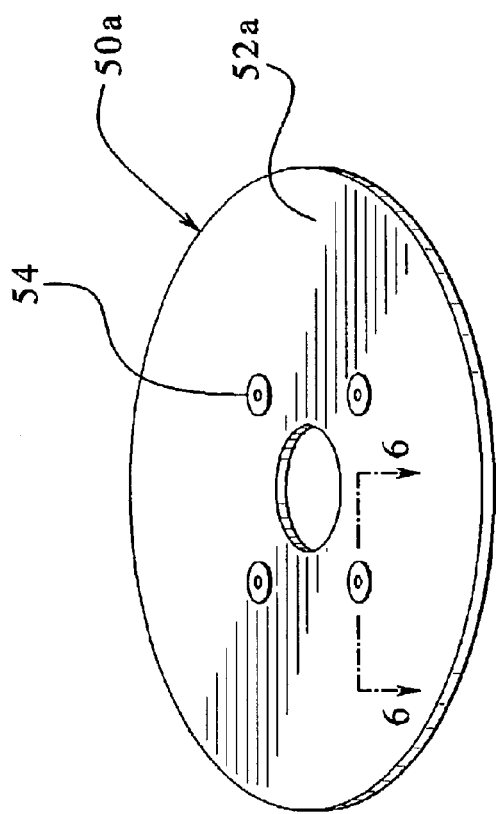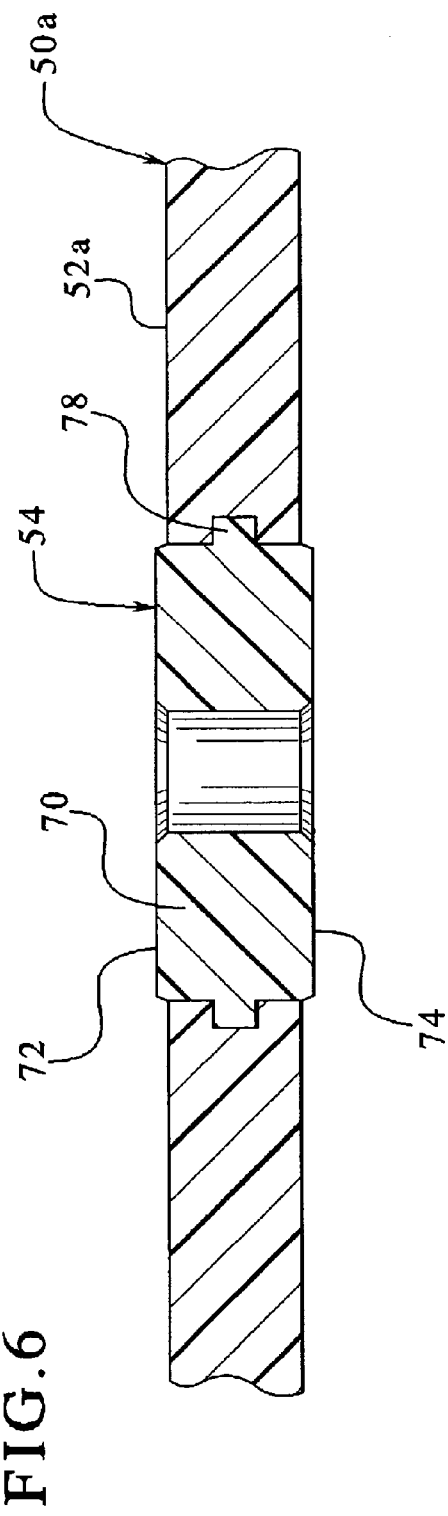
FIG.5
FIG.6

RAILROAD CAR CENTER PLATE ASSEMBLY CONDUCTIVE LINER

BACKGROUND OF THE INVENTION

The present invention relates in general to a conductive center plate assembly liner for a railroad car, and more particularly to a conductive center plate assembly liner for placement between a car body center plate and a truck bolster bowl in a railroad car, wherein the liner includes a wear resistant load-bearing portion and a plurality of compressible conductive resilient members which provide electrical conductivity between the car body center plate and truck bolster bowl of the center plate assembly.

Conventional freight railroad cars are generally constructed with a body having an underframe including a pair of spaced-apart center plates. The center plates rest on and are rotatably or swivelly received by a pair of spaced-apart trucks. The trucks rollingly support the car along conventional railroad tracks. Each car body is swivelly or rotatably received by a truck bolster by a conventional center plate assembly that includes a car body center plate attached to the underframe, a truck bolster bowl attached to the truck, and a liner, bearing or wear element positioned between the center plate and the bowl. A conventional kingpin extends through the car body center plate and the truck bolster bowl. The liners have generally been horizontal or disk-shaped, cup-shaped or bowl-shaped.

Such liners must provide electrical continuity or conductivity between the car body center plate and the truck bolster bowl. This electrical continuity or conductivity provides a ground for the railroad car body which eliminates or reduces the buildup of static electricity on the car body. The electric continuity or conductivity also provides the ability to obtain signals through the railroad tracks or rails.

Manganese steel liners were used as wear elements in center plate assemblies for many years in the railroad industry. The steel liners provided electrical continuity between the car body center plate and the truck bolster bowl. However, the steel liners did not significantly reduce wear to the center plate or the bowl and required periodic lubrication.

To solve this problem, certain types of plastic center plate assembly wear liners have been used between the car body center plate and the truck bolster bowl to reduce wear on these parts by eliminating the metal-to-metal contact incurred with the steel liners. These plastic liners are self-lubricating and thus reduce the wear to these parts. Plastic liners, however, do not provide the necessary electrical continuity between the car body center plate and the truck bolster bowl.

To solve this problem, solid brass, copper or other metal electrically conductive studs or pins have been placed in these plastic liners to provide metal-to-metal contact between the center plate and bowl to create electrical continuity. These studs or pins engage both center plate and bowl to provide the electrical continuity. However, these metal studs or pins substantially increase the friction between the center plate and bowl. Moreover, the heads of these metal studs or pins tend to break or wear off and then become less effective and possibly not effective at all in providing electrical continuity between the car body center plate and the truck bolster bowl.

To solve this problem, certain plastic liners have been made with inner conductive rings as disclosed in U.S. Pat. Nos. 5,908,001, 6,136,240 and 6,041,714. However, a potential problem with such liners is a lack of conductivity between the car body center plate and the truck bolster bowl due to uneven seating of the center plate in the bowl, the build-up of grease and dirt and irregular surfaces of the center plate and the bowl. Additionally, since these liners have been commercially made from an ultra-high-weight polyethylene ("UHMWPE"), they are potentially subject to cold flow under the weight of the freight car supported by the car body center plates. There is currently no known solution to these problems.

Accordingly, while there has been a steady progression of improvements of the liners for center plate assemblies of railroad cars, there is still a need for an improved railroad car center plate assembly liner which ensures better conductivity than known liners and is more resistant to cold flow than known liners.

SUMMARY OF THE INVENTION

The present invention overcomes the above problems by providing a railroad car center plate assembly liner which ensures better conductivity than known liners and is more resistant to cold flow than known liners. The liner of one embodiment of the present invention includes a self-lubricating load-bearing portion that withstands abrasion and substantially resists cold flow. The liner includes at least one and preferably a plurality of spaced-apart symmetrically arranged compressible conductive resilient members positioned in the load-bearing portion. Each of the conductive resilient members slightly transversely extend above and below the planes of the top and bottom surfaces, respectively, of the load-bearing portion of the liner to facilitate the electric conductivity between the truck bolster bowl and the car body center plate. As described in more detail below, the conductive members are made from a resilient material which enables them to continue to provide electric continuity even when they are compressed, deformed or crushed under the weight of the railroad car.

In one embodiment of the present invention, the body of the liner including the load-bearing portion of the liner is made of a urethane, and in one preferred embodiment is made of a glass-filled urethane. In this embodiment, the glass reinforces the load-bearing portion. The glass may be in granules, fibers or other suitable forms. The word "particle" used herein is intended to include granules and/or fibers of any suitable type and such other suitable forms. The glass-filled urethane load-bearing portion substantially resists cold flow from the weight of the car. The body of the liner is preferably injection molded.

In one preferred embodiment of the present invention, the conductive resilient members of the liner are made of a urethane to resist cold flow and to be sufficiently compressible or resilient. The conductive members include conductive particles such as carbon black particles which make these members conductive. The urethane conductive members are preferably unfilled except with the conductive particles because urethane has a greater memory characteristic which provides sufficient resiliency to the members and enables them to function in a spring-like manner to maintain contact with the center plate and bowl and also to compensate for irregular surfaces of the center plate and bowl. In other words, the conductive members have a rubber-like characteristic and are resilient enough to push upwardly and downwardly in a similar fashion to a coil spring. This is substantially different than the previous known metal studs which tend to break because they had no relative resiliency. The conductive members are preferably preformed injection molded members. It should be appreciated that the conductive members could alternatively be partially filled with strengthening material such as glass particles to add a desired amount of strength to the members; however, such additional strength would reduce the memory effect of the compressible conductive members.

It is therefore an advantage of the present invention to provide a center plate assembly liner for placement in a center plate assembly between the car body center plate and the truck bolster bowl of a railroad car, wherein the liner includes a body having a self-lubricating load-bearing portion highly resistant to cold flow and at least one and preferably a plurality of compressible conductive resilient members resistant to cold flow and for providing electrical continuity between the truck bolster and the car body.

Other objects, features and advantages of the invention will be apparent from the following detailed disclosure, taken in conjunction with the accompanying sheets of drawings, wherein like numerals refer to like parts, elements, components, steps and processes.

DESCRIPTION OF THE DRAWINGS

FIG. 5 is a top perspective view of an alternative embodiment of the present invention which is disk-shaped.

FIG. 6 is a fragmentary enlarged sectional view taken substantially along line 6—6 of FIG. 5.

DESCRIPTION OF THE INVENTION

Figure 1:
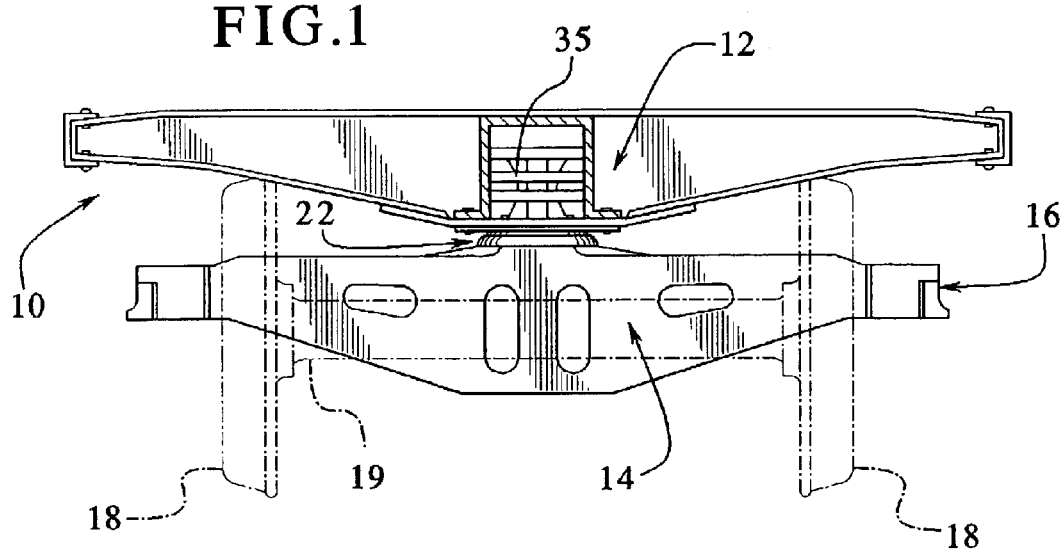
FIG. 1 is a somewhat diagrammatic transverse cross-sectional view taken substantially through the underframe of a railroad car generally illustrating a center plate assembly on a body bolster and a truck bolster of a railroad car, and illustrating the truck wheels and axle in phantom and having the truck side frames omitted for clarity purposes.

Referring now to the drawings, and particularly to FIG. 1, a conventional railroad car underframe 10 includes a conventional car body bolster 12 resting on and swivelly or rotatably received by a conventional truck bolster 14 of a car truck 16. The truck 16 includes wheels 18 mounted to an axle 19 (shown in phantom). The wheels are adapted to engage standard railroad tracks (not shown). The truck 16 is attached to the truck bolster 14 and would also include side frames that have been omitted for purposes of clarity.

A conventional center plate assembly 22 is positioned between the truck bolster and the body bolster. As illustrated more particularly in FIG. 4, the center plate assembly 22 includes a truck bolster bowl 24 suitably attached to or integrally formed with the truck bolster 14 (see FIG. 1), and a car body center plate 34 suitably attached to a center filler 35 (see FIG. 1) which in turn is suitably attached to the body bolster 12 (see FIG. 1) in a conventional manner.

Figure 4:
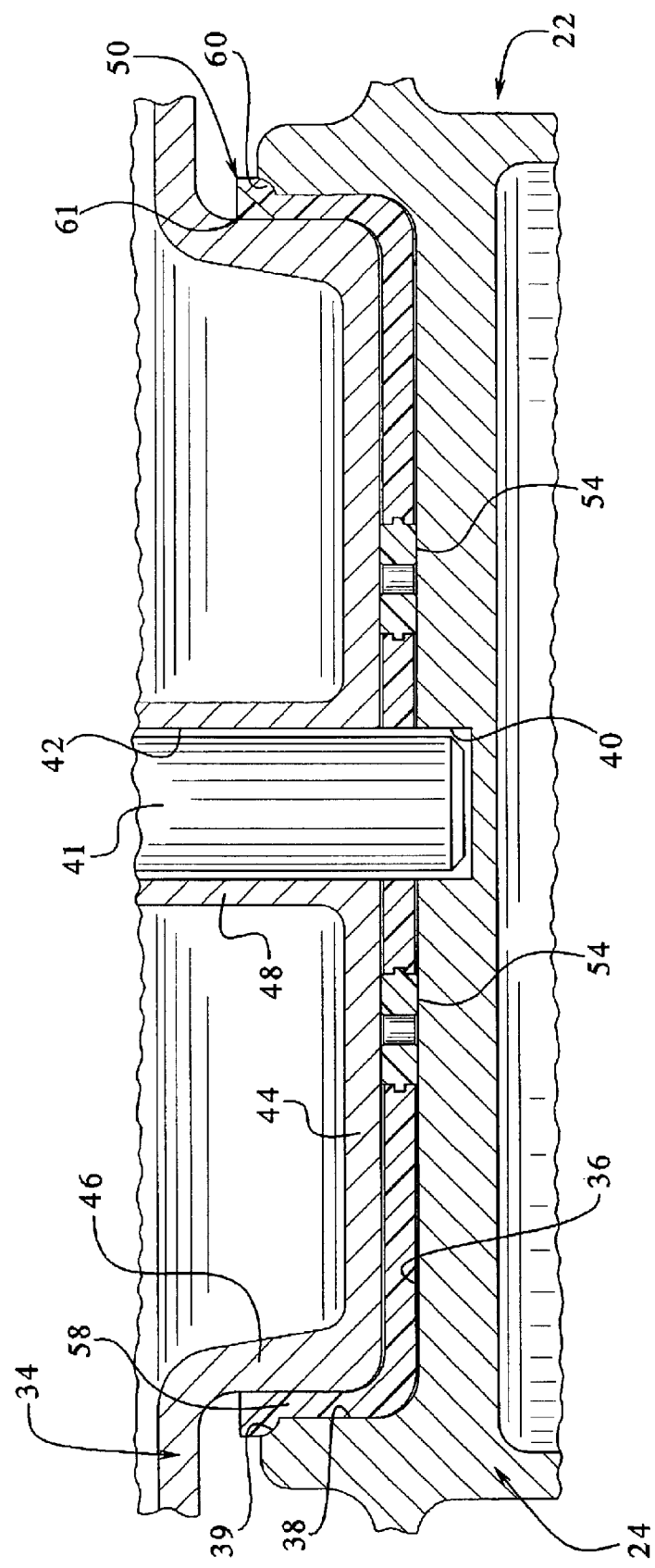
FIG. 4 is a transverse sectional view taken substantially through the center plate assembly and illustrating the liner of FIGS. 2 and 3 disposed between the car body center plate and the truck bolster bowl.
Figure 7:
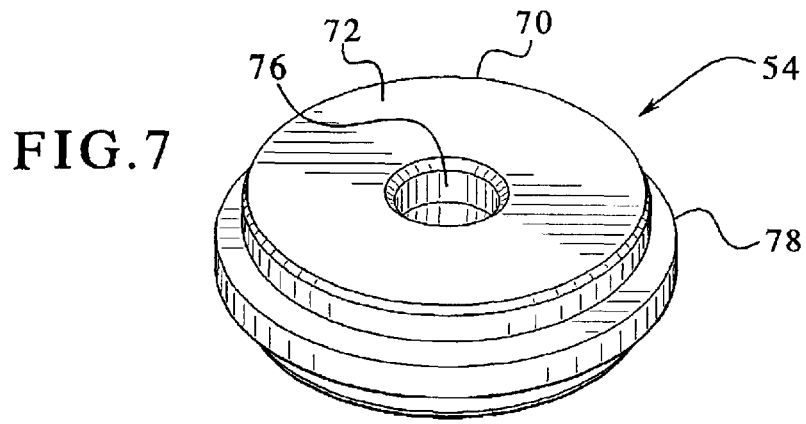
FIG. 7 is a top perspective view of the conductive member of one embodiment of the present invention.
Figure 8:
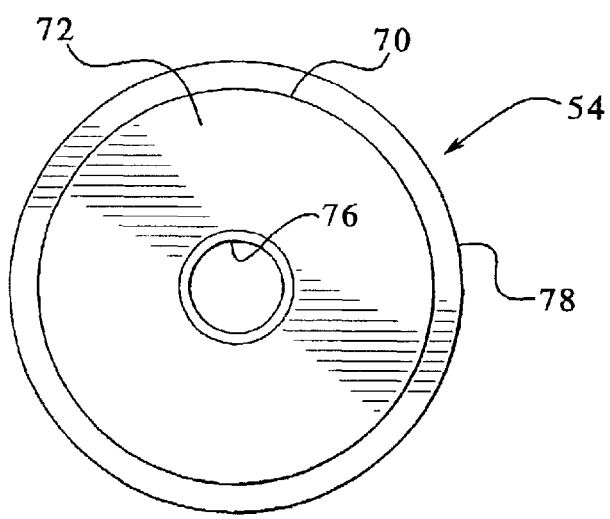
FIG. 8 is a top plan view of the conductive member of FIG. 7.
Figure 9:
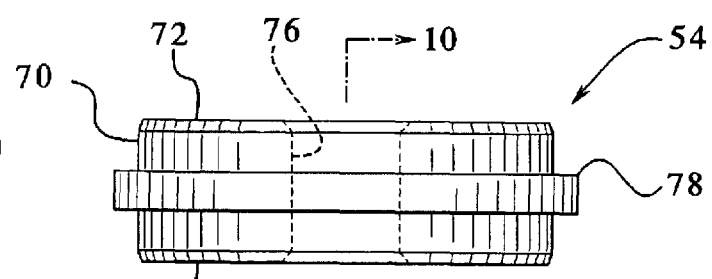
FIG. 9 is a side elevation view of the conductive member of FIG. 7.
Figure 10:
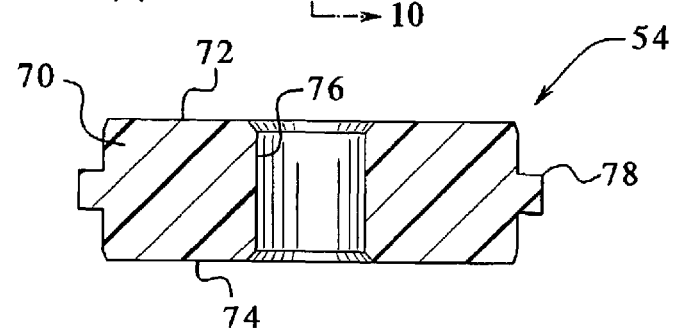
FIG. 10 is a cross-sectional view of the conductive member of FIG. 7 taken substantially along line 10—10 of FIG. 9.

The truck bolster bowl 24 is in the form of a bowl having a generally smooth horizontally disposed circular floor base wall or bottom 36 and a generally smooth vertically disposed circumambient upstanding side wall 38 as illustrated in FIG. 4. The truck bolster bowl 24 may include a conventional annular j-groove 39 at the upper end of the inner surface of the side wall 38 which was previously used for welding material for welding a steel liner in the truck bolster bowl. The car body center plate 34 defines or includes a centrally positioned central bore 42 sized to receive a kingpin or kingbolt 41. The truck bolster bowl 24 defines or includes a centrally positioned circular aperture or blind bore 40 sized to receive the lower end of the kingpin or kingbolt 41. The car body center plate 34 includes a horizontally disposed circular base wall or bottom 44 connected to a generally vertically disposed circumambient upstanding perimeter wall 46 and to a vertically extending tubular wall 48 which specifically defines the bore 42 that receives the kingpin 41. The kingpin 41 defines the rotational interrelationship between the center plate and bowl of the center plate assembly.

Figure 2:
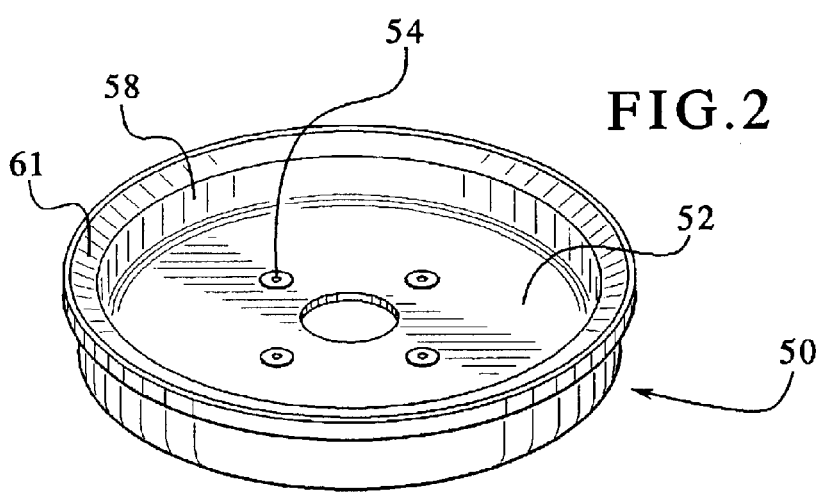
FIG. 2 is a top perspective view of the one embodiment of the center plate assembly liner of the present invention.
Figure 3:
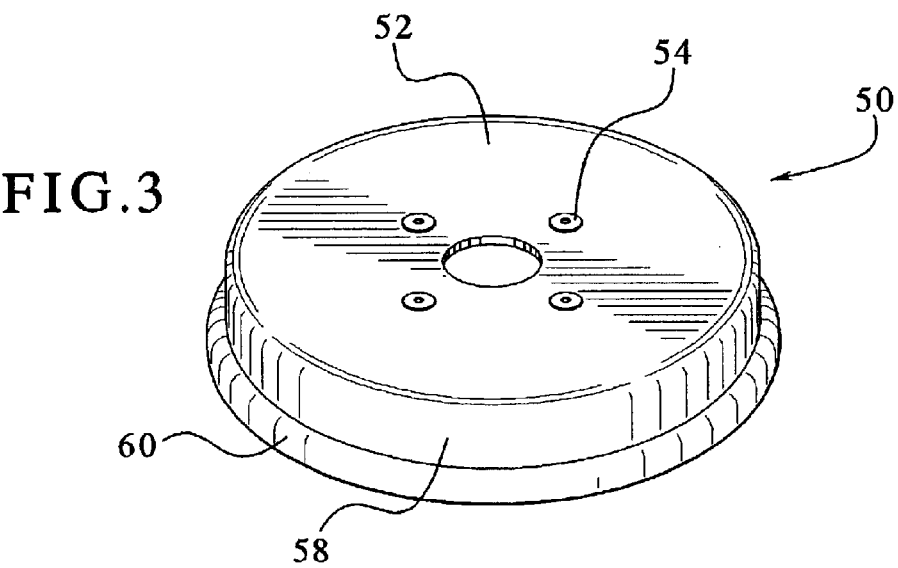
FIG. 3 is a bottom perspective view of the liner of FIG. 2.

In one embodiment, the liner 50 of the present invention is similarly bowl-shaped as illustrated in FIGS. 2 and 3 (removed from the center plate assembly) and sized as illustrated in FIG. 4 to be positioned between the car body center plate 34 and the truck bolster bowl 24. The liner 50 includes a generally bowl-shaped body having a circular bottom or bottom wall that includes a load-bearing portion 52 and at least one and preferably a plurality of conductive resilient members 54 preferably integrally mounted in and slightly extending transversely (i.e., vertically or above and below) from opposite sides or surfaces (i.e., the top and bottom surfaces) of the load-bearing portion as described in more detail below. The load-bearing portion 52 preferably constitutes most of the bottom of the liner 50 to support the body of the railroad car. The conductive resilient members 54 are described in more detail below in conjunction with FIGS. 6 to 10.

This embodiment of the liner includes a circumambient or cylindrical upstanding outer wall 58 connected to the load-bearing portion 52 and which also extends vertically between the center plate and bowl. In this embodiment, the upper end of the cylindrical wall 58 includes an annular bead or rim 60 which may take other forms in order to suitably fit a truck bolster bowl. In this embodiment, the inside edge of the rim 60 defines a beveled surface 61 which helps to facilitate the sliding of the car body center plate 34 into the liner 50 when the center plate and bowl are brought together. The upstanding wall 58 of the bowl-shaped liner serves to provide a bearing surface between the side wall 38 of the truck bolster bowl and the side wall 46 of the car body center plate 34.

One embodiment of the conductive resilient member 54 is illustrated in FIGS. 6, 7, 8, 9 and 10. This illustrated embodiment of the conductive member 54 includes a substantially cylindrical body 70 having opposing areas or conducting portions 72 and 74 which at least partially define extensions which are adapted to engage the bottom surface of the car body center plate 34 and the top surface of the truck bolster bowl 24 as illustrated in FIG. 4. More specifically, the body has a thickness (i.e., height) which is greater than the thickness (i.e., height) of the load-bearing portion 52 of the liner 50. Thus, as illustrated in FIG. 4 (and also as illustrated in the alternative embodiment in FIG. 6), the conductive member is preferably positioned centrally in and attached to the load-bearing portion such that a conducting portion 72 of the body 70 extends above the plane of the top surface of the load-bearing portion 52 and a conducting portion 74 of the body 70 extends below the plane defined by the bottom surface of the load-bearing portion 52. Thus, it should be appreciated that the conductive resilient members are preferably sized and shaped to produce reliable electrical continuity between the car body center plate and truck bolster bowl. It should be appreciated that the conductive members are not limited to being cylindrical and could be in another suitable shape.

In one embodiment, the conductive members each include one or more attachments or mounting flanges, lips or members 78 preferably extending transversely from the body 70 and substantially about the entire periphery of the body. The mounting flange facilitates the attachment, forming coupling, or mating of the conductive member to the load-bearing portion. In an alternative embodiment, the structure could be reversed such that the conductive members each include one or more attachment slots or mounting slots sized to receive a mounting flange formed or extending from the load-bearing portion into the mounting slot(s). The mounting flange which extends from the body 70 facilitates a secure and fixed mechanical engagement between the conductive member and the load-bearing portion as illustrated in FIG. 4 and further illustrated in FIG. 6. Other suitable mechanical arrangements are within the scope of the present invention.

The body also defines an inner aperture 76 which extends transversely through the body. This aperture is sized to receive a pin or support in the mold which maintains the relative position of the conductive members during the molding of the load-bearing portion and the rest of the liner 50 around the conductive resilient members as discussed below. The aperture also facilitates the spring action of the conductive members 54. Specifically, if the conductive member is compressed, deformed or crushed under the weight of the car, the material of the member will tend to move or stretch into the space of the aperture. This, in part, allows for the spring-like action of the conductive members.

Referring now specifically to FIGS. 5 and 6, an alternative embodiment of the liner of the present invention indicated by numeral 50a is illustrated. The liner has a load-bearing portion 52a and conductive resilient members 54a. The liner 50a is formed without the upstanding wall illustrated in the embodiment of FIGS. 2 and 3. It should thus be appreciated that the liner of the present invention can be formed in alternative suitable shapes and forms.

In the presently preferred embodiment of the liner of the present invention, the load-bearing portion is made from an approximately 30% glass-filled urethane with a hardness durometer of 70 D to 75 D. This material is commercially available from numerous sources such as RTP, Advance Polymer Compounding (APC), Noveon, Bayer, GE Plastics, and Dow Chemical. It should be appreciated that the load-bearing portion of the liner is preferably made from a glass-filled urethane in the range of approximately 10% to 50%, but that other ranges are possible. In alternative embodiments, the load-bearing portion is made from a non-glass-filled urethane but preferably is filled with strengthening materials, or another suitable material.

In the presently preferred embodiment, the conductive resilient members are made from a urethane filled with approximately 23% to 25% of carbon black particles. This material is commercially available from numerous sources such as RTP, Advance Polymer Compounding (APC), Noveon, Bayer, GE Plastics, and Dow Chemical. It should be appreciated that the conductive resilient members are preferably made from a carbon black filled urethane in the range of approximately 10% to 50%, but that other ranges are possible. The members with the carbon black conductive particles serve to assure electrical conductivity between the upper and lower surfaces of the conductive resilient member to electrically connect the car body center plate with the truck bolster bowl which in turn provides the car body with a grounding mechanism to avoid the build-up of static electricity in the car and to provide the ability to receive signals from the railroad track. The resiliency or memory characteristic of the urethane members facilitates this conductivity.

In one embodiment, the liner of the present invention is made by injection molding or otherwise suitably forming the conductive resilient members and then injection molding the load-bearing portion and the rest of the body around and between the conductive resilient members. More specifically, the conductive resilient members are preferably preformed injection molded cylindrical members. The conductive resilient members are placed in an injection mold in a spaced-apart symmetrical relation and the load-bearing portion is preferably injection molded around the conductive resilient members under suitable pressure and heat to form the liner as a monolithic structure. The load-bearing portion and conductive members are thus fused together to form a one-piece liner. The attachment or mounting member 78 also provides a mechanical lock, engagement or coupling between the conductive resilient members and the load-bearing portion.

Since the conductive members are carbon filled urethane, the conductive members will have less wear than the glass-filled urethane load-bearing portion 52. It should be appreciated that the conducting portions of the body 70 of the conductive resilient members are adapted to be compressed, deformed or crushed by the weight of the railroad car. When these areas are compressed, deformed or crushed, they will expand into the aperture of the conductive member and the elastic conductive members will maintain contact with and continue to provide substantial electrical continuity between the center plates and bowl. Unlike the previously known metal studs, these elastic or resilient compressible conductive members will not have a tendency to break or wear off.

In view of the foregoing, it is particularly appreciated that the liner of the present invention satisfies the criteria for railway cars that must have electrical continuity between the car body and the truck in order to avoid the buildup of static electricity and for signaling, as well as to provide a self-lubricating liner that is more resistant to cold flow and that can withstand the rigorous abuse between a car body and a truck and reduce maintenance costs.

It will be understood that modifications and variations may be effected without departing from the scope of the novel concepts of the present invention, but it is understood that this application is to be limited only by the scope of the appended claims.

The invention is claimed as follows:

1. A railroad car center plate assembly liner for placement between a car body center plate and a truck bolster bowl of a railroad car, said liner comprising:

a body sized to be placed between said car body center plate and the truck bolster bowl, said body including a substantially flat load-bearing portion being of a thickness defined by a first surface and a second surface, and defining a central opening for receiving a kingpin; and at least one compressible conductive resilient member securely positioned in the load-bearing portion, each said compressible conductive resilient member having a body extending through the load-bearing portion and being of a thickness greater than the thickness of the load-bearing portion, each said compressible conductive resilient member positioned in the load-bearing portion such that conductive portions of the body extend transversely from the first and second surfaces of the load-bearing portion and are operable to provide electrical conductivity between the truck bolster bowl and the car body center plate when the liner is placed between the car body center plate and the truck bolster bowl.

2. The railroad car center plate assembly liner of claim 1, which includes a mechanical lock between each compressible conductive resilient member and the load-bearing portion.

3. The railroad car center plate assembly liner of claim 2, wherein the mechanical lock includes a mounting flange extending transversely from the body of each compressible conductive resilient member and extending into the load-bearing portion.

4. The railroad car center plate assembly liner of claim 1, wherein the body of each compressible conductive resilient member is cylindrical.

5. The railroad car center plate assembly liner of claim 4, wherein the cylindrical body includes a cylindrical mounting flange extending transversely from the body and extending into the load-bearing portion.

6. The railroad car center plate assembly liner of claim 1, which includes a plurality of spaced apart compressible conductive resilient members securely positioned in the load-bearing portion.

7. The railroad car center plate assembly liner of claim 6, wherein the plurality of spaced apart compressible conductive resilient members are symmetrically arranged in the load-bearing portion.

8. The railroad car center plate assembly liner of claim 1, wherein the load-bearing portion is made from a glass-filled urethane.

9. The railroad car center plate assembly liner of claim 8, wherein the glass-filled urethane includes approximately 10% to 50% of glass particles.

10. The railroad car center plate assembly liner of claim 8, wherein the glass-filled urethane includes approximately 30% of glass particles.

11. The railroad car center plate assembly liner of claim 8, wherein the glass-filled urethane has a hardness durometer of 70 D to 75 D.

12. The railroad car center plate assembly liner of claim 1, wherein each compressible conductive resilient member is formed from a urethane filled with conductive particles.

13. The railroad car center plate assembly liner of claim 12, wherein each conductive member includes approximately 10% to 50% of conductive particles.

14. The railroad car center plate assembly liner of claim 12, wherein each conductive members includes approximately 23% to 25% of conductive particles.

15. The railroad car center plate assembly liner of claim 12, wherein the conductive particles in each conductive member are carbon particles.

16. The railroad car center plate assembly liner of claim 1, wherein each conductive member defines a central opening.

17. The railroad car center plate assembly liner of claim 1, wherein the body is disk-shaped.

18. The railroad car center plate assembly liner of claim 1, wherein the body is bowl-shaped.

19. In a center plate assembly on a railroad car including a car body center plate, a truck bolster bowl aligned with the center plate by a kingpin, the improvement being in a self-lubricating conductive railroad car center plate assembly liner positioned between said car body center plate and said truck bolster bowl, said self-lubricating conductive railroad car center plate assembly liner comprising:

a body sized to be placed between said car body center plate and the truck bolster bowl, said body defining a central opening for receiving said kingpin and being of a thickness defined by a first surface and a second surface; and at least one compressible conductive resilient member securely positioned in the body, each said compressible conductive resilient member extending through the load-bearing portion and being of a thickness greater than the thickness of the load-bearing portion, each said compressible conductive resilient member positioned in the body such that conductive portions of the body extend transversely from the first and second surfaces and operate to provide electrical conductivity between the truck bolster bowl and the car body center plate.

20. The railroad car center plate assembly liner of claim 19, which includes a mechanical lock between each compressible conductive resilient member and the body.

21. The railroad car center plate assembly liner of claim 20, wherein the mechanical lock includes a mounting flange extending into the body.

22. The railroad car center plate assembly liner of claim 19, wherein each compressible conductive resilient member is cylindrical.

23. The railroad car center plate assembly liner of claim 22, wherein each compressible conductive resilient member includes a cylindrical mounting flange extending transversely into the body.

24. The railroad car center plate assembly liner of claim 19, which includes a plurality of spaced apart compressible conductive resilient members securely positioned in the body.

25. The railroad car center plate assembly liner of claim 24, wherein the plurality of spaced apart compressible conductive resilient members are symmetrically arranged in the body.

26. The railroad car center plate assembly liner of claim 19, wherein the body is made from a glass-filled urethane.

27. The railroad car center plate assembly liner of claim 26, wherein the glass-filled urethane includes approximately 10% to 50% of glass particles.

28. The railroad car center plate assembly liner of claim 26, wherein the glass-filled urethane includes approximately 30% of glass particles.

29. The railroad car center plate assembly liner of claim 26, wherein the glass-filled urethane has a hardness durometer of 70 D to 75 D.

30. The railroad car center plate assembly liner of claim 19, wherein each compressible conductive resilient member is formed from a urethane filled with conductive particles.

31. The railroad car center plate assembly liner of claim 30, wherein each conductive member includes approximately 10% to 50% of conductive particles.

32. The railroad car center plate assembly liner of claim 30, wherein each conductive member includes approximately 23% to 25% of conductive particles.

33. The railroad car center plate assembly liner of claim 30, wherein the conductive particles in each conductive member are carbon particles.

34. The railroad car center plate assembly liner of claim 19, wherein each conductive member defines a central opening.

35. The railroad car center plate assembly liner of claim 19, wherein the body is disk-shaped.

36. The railroad car center plate assembly liner of claim 19, wherein the body is bowl-shaped.

37. A railroad car center plate assembly liner for placement between a car body center plate and a truck bolster bowl of a railroad car, said liner comprising:

a body sized to be placed between said car body center plate and the truck bolster bowl, said body including a substantially flat glass-filled urethane load-bearing portion being of a thickness defined by a first surface and a second surface, and defining a central opening for receiving a kingpin;

a plurality of spaced apart compressible conductive resilient members securely positioned in the load-bearing portion, each said compressible conductive resilient member formed from a urethane filled with conductive particles, each conductive member defining a central opening, each said compressible conductive resilient member having a body extending through the load-bearing portion and being of a thickness greater than the thickness of the load-bearing portion, each said compressible conductive resilient member positioned in the load-bearing portion such that conductive portions of the body extend transversely from the first and second surfaces of the load-bearing portion and are operable to provide electrical conductivity between the truck bolster bowl and the car body center plate when the liner is placed between the car body center plate and the truck bolster bowl; and a mechanical lock between each compressible conductive resilient member and the load-bearing portion.

38. The railroad car center plate assembly liner of claim 37, wherein the mechanical lock includes a mounting flange extending transversely from the body and extending into the load-bearing portion.

39. The railroad car center plate assembly liner of claim 37, wherein the body of each compressible conductive resilient member is cylindrical.

40. The railroad car center plate assembly liner of claim 37, wherein the plurality of spaced apart compressible conductive resilient members are symmetrically arranged in the load-bearing portion.

41. The railroad car center plate assembly liner of claim 37, wherein the glass-filled urethane includes approximately 10% to 50% of glass particles.

42. The railroad car center plate assembly liner of claim 37, wherein the glass-filled urethane includes approximately 30% of glass particles.

43. The railroad car center plate assembly liner of claim 37, wherein the glass-filled urethane has a hardness durometer of 70 D to 75 D.

44. The railroad car center plate assembly liner of claim 37, wherein each conductive member includes approximately 10% to 50% of conductive particles.

45. The railroad car center plate assembly liner of claim 37, wherein each conductive members includes approximately 23% to 25% of conductive particles.

46. The railroad car center plate assembly liner of claim 37, wherein the conductive particles in each conductive member are carbon particles.

47. The railroad car center plate assembly liner of claim 37, wherein the body is disk-shaped.

48. The railroad car center plate assembly liner of claim 37, wherein the body is bowl-shaped.

* * * * *